United States Patent [19]

Goldsmith

[11] 4,239,287
[45] Dec. 16, 1980

[54] SOLUTION MINING POTASSIUM CHLORIDE FROM HEATED SUBTERRANEAN CAVITIES

[75] Inventor: Elmar L. Goldsmith, Regina, Canada

[73] Assignee: PPG Industries Canada, Ltd., Regina, Canada

[21] Appl. No.: 8,314

[22] Filed: Feb. 1, 1979

[51] Int. Cl.² .................................................. E21C 41/08
[52] U.S. Cl. .................................................. 299/4; 299/5
[58] Field of Search ................. 299/4, 5, 6; 166/272

[56] References Cited

U.S. PATENT DOCUMENTS

| | | |
|---|---|---|
| 2,331,890 | 10/1943 | Cross . |
| 2,665,124 | 1/1954 | Cross .................................. 299/5 |
| 2,919,909 | 1/1960 | Rule . |
| 3,050,290 | 8/1962 | Caldwell ............................ 299/5 |
| 3,148,000 | 9/1964 | Dahms et al. ...................... 299/5 |
| 3,278,234 | 10/1966 | Helvenston et al. ............... 299/4 |
| 3,284,137 | 11/1966 | Wolber .............................. 299/5 |

Primary Examiner—William F. Pate, III
Attorney, Agent, or Firm—Irwin M. Stein; Walter M. Benjamin

[57] ABSTRACT

Disclosed is a method of increasing the solution mining rate of potassium chloride from a cavity in a subterranean ore deposit containing potassium chloride and sodium chloride, in which cavity ore has been rubblized to effect a large contact surface area, by (1) solution mining the ore rubble at a first temperature for a time sufficient to determine the mining rate at that temperature; (2) increasing the temperature of the cavity solution to a temperature determined to be near the highest temperature at which the invariant composition is achievable at the solvent dissolving rate; and (3) solution mining the ore at the higher temperature.

17 Claims, 2 Drawing Figures

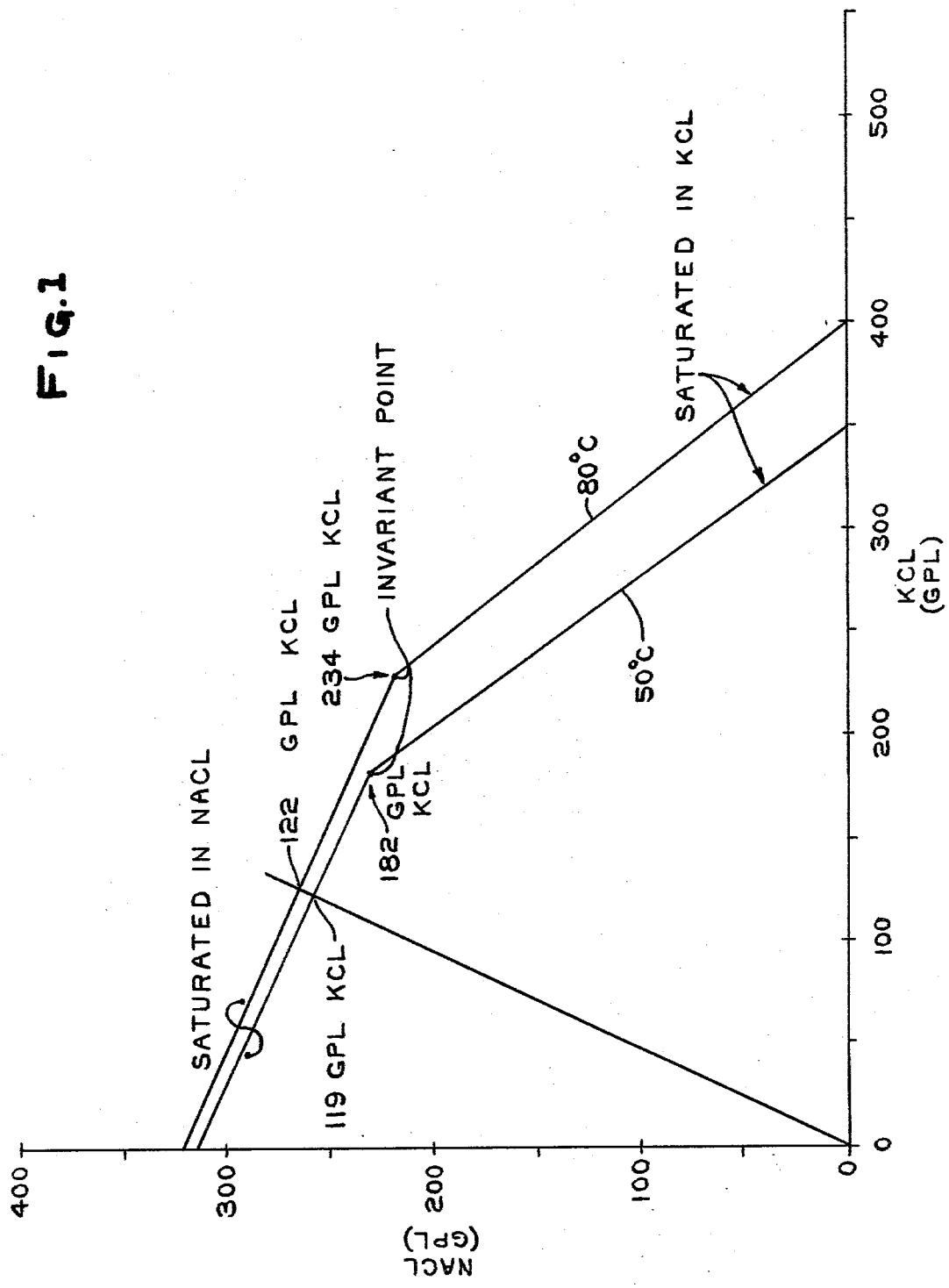

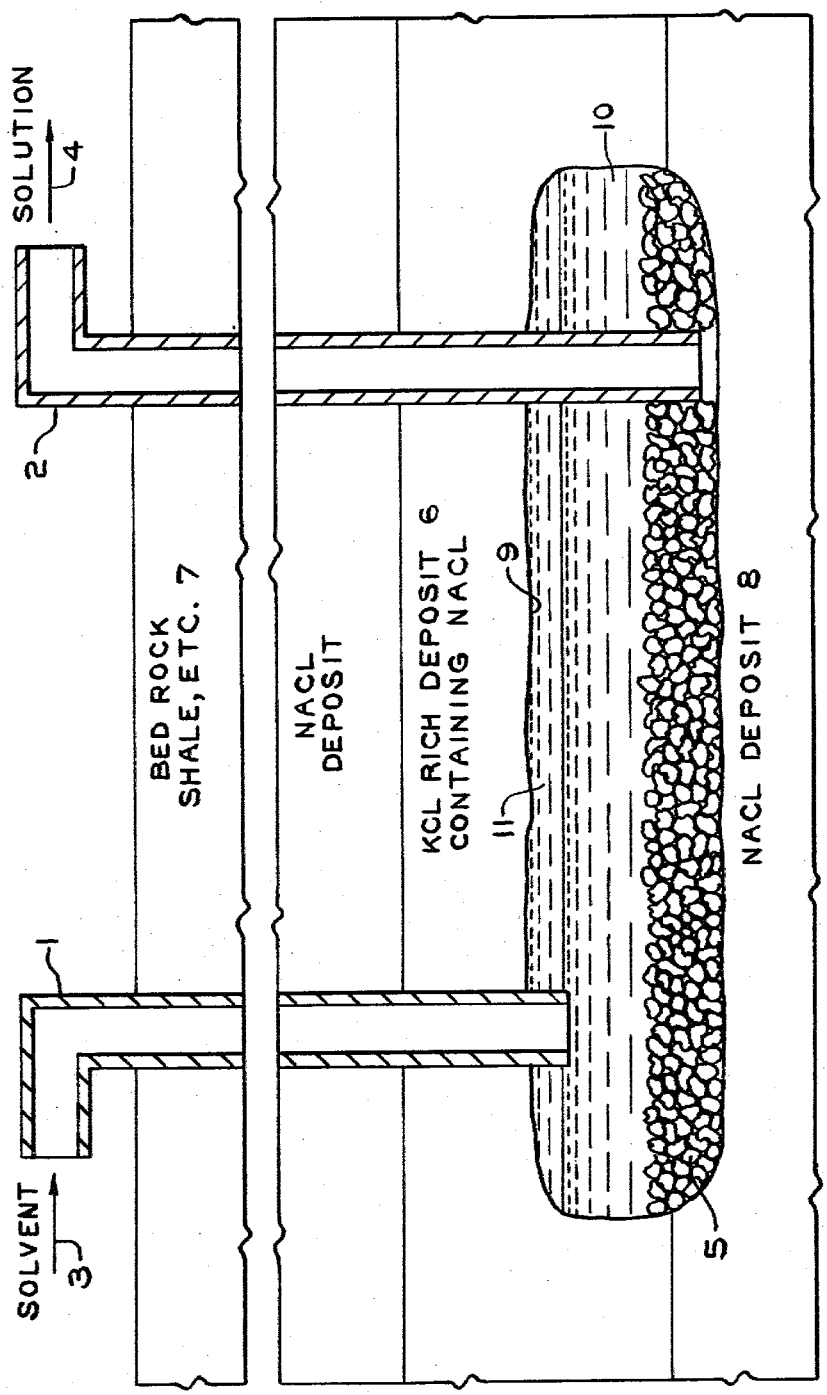

SOLUTION MINING POTASSIUM CHLORIDE FROM HEATED SUBTERRANEAN CAVITIES

BACKGROUND OF THE INVENTION

This invention relates to a novel method of solution mining potassium chloride from a subterranean deposit containing potassium chloride and sodium chloride. More particularly, this invention relates to a novel method whereby the salts are mined at a ratio near the invariant composition of the solution. And even more particularly, this invention involves a novel method of mining potassium chloride near the invariant composition of the solution at a temperature higher than the deposit temperature.

Potassium chloride usually occurs in mineral deposits closely associated with sodium chloride. Often, potassium chloride exists as mixtures or in combination with sodium chloride in the form of a potassium chloride-rich stratum (containing 15 to 60 percent potassium chloride based on the total weight of potassium chloride and sodium chloride in the stratum) or a plurality of such deposits which are disposed immediately above and below other strata which are lean as to potassium chloride (containing less than 15 percent thereof by weight) or which contain no substantial amount of potassium chloride and/or preponderantly sodium chloride. These strata may be folded or domed or take various other shapes and may contain various amounts of other minerals, such as clay, sulfates of calcium and magnesium, as well as chlorides of the alkaline earth metals and the like.

These deposits may be found anywhere between about 700 to between about 1800 meters deep and even deeper. Such deposits may be found in New Mexico, Utah, Northern United States, Canada as well as other parts of the world.

It is of commercial interest to produce potassium chloride from these subterranean deposits. A number of methods have been developed for the recovery of the potassium chloride by extraction with water. Accordingly, a well is drilled through the potassium chloride-rich strata or deposit and downwardly into the zone in which the potassium chloride concentration is low, i.e., below 15 percent based the weight of potassium chloride and sodium chloride, or is substantially non-existent and where sodium chloride is comparatively high. Water or an aqueous solution which is unsaturated as to sodium chloride is cause to flow down the well either through a pipe disposed in the well or through the concentric area within the well but outside the pipe, and the potassium chloride-lean, sodium chloride-rich strata is extracted to establish a cavity in the manner well known to the art of extracting sodium chloride from subterranean deposits. Two such cavities are created and joined by lateral growth. Subsequently, the cavity roof is mined upwardly through the potassium chloride-rich strata. In other instances two spaced wells are drilled through the potassium chloride rich strata or deposit and downwardly into the zone in which the potassium chloride concentration is low and communication between the bottom of the wells are made by fracturing with hydraulic pressure. Again, the fracture is mined upwardly through the potassium chloride-rich strata. There are other recognized methods of the art as well. In all these cases a large cavity is best created by circulating water or brine through one well and withdrawing a solution enriched in sodium chloride and potassium chloride from a second well. In many of these methods potassium chloride is mined at a ratio very close to the ratio at which it occurs in the deposit.

In one method taught by U.S. Pat. No. 3,278,234 solution mining is enhanced when dissolving potassium chloride and sodium chloride from the deposit to form an aqueous solution richer in both potassium chloride and sodium chloride by maintaining the temperature of the solvent hotter than the effluent and maintaining the temperature within about 15° C. of the natural (undisturbed) formation temperature thereby avoiding undue cooling of the cavity solution. This patent further discloses that at depths below about 700 meters to 900 meters the effluent temperature is held within about 5° C. and preferably 3° C. of the natural deposit temperature.

In another method taught by U.S. Pat. No. 3,148,000, potassium chloride is mined in commercial amounts from a deposit containing from 0.1 to 15 percent or more of potassium chloride based up the combined amount of potassium chloride and sodium chloride within the deposit. The cavity is increased in size by reducing the water pressure therein thereby causing its roof to collapse. Similarly, a rubble of deposit ore may be created in the center of the cavity by drilling a well to immediately above the top of the cavity and exerting hydraulic pressure on the top of the cavity to cause the roof thereof to fall into the cavity. (See U.S. Pat. No. 2,919,909). In this fashion, a large surface area of potassium chloride-rich ore is provided within the cavity. Thus, the ratio of potassium chloride recovered from the cavity is greater than the ratio that occurs in the ore deposit.

In the cases where water is used as the solvent and a large cavity is created as in the former methods described, potassium chloride is dissolved at the ratio it occurs in the deposit, e.g., about 30 percent potassium chloride by weight. In the method of rubble mining, the invariant composition of the solution may be reached for the deposit temperature, e.g., a composition where the solution attains a ratio greater than that which occurs in the deposit, e.g., greater than a deposit ratio of 30 percent potassium chloride. By invariant composition is meant a solution having a composition saturated with respect to both potassium chloride and sodium chloride at a given temperature (this composition ratio is changed by the presence of other metal ions such as magnesium and calcium).

In yet another method taught in U.S. Pat. No. 3,262,741 a solution which is relatively saturated with respect to sodium chloride and relatively unsaturated with respect to potassium chloride and which is produced from a new cavity is fed into a fully developed cavity wherein the solution is allowed to remain until it reaches the invariant composition for the deposit temperature. The resident time for the relatively unsaturated solution is reduced by feeding the relatively unsaturated solution produced from the new cavity into a cavity that is still productive. But, the average flow through a cavity mined in this manner is much less than that which is allowed by average size piping, e.g., less than about 90 cubic meters per hour.

Hence, in all of the above described methods no provision has been made so that an invariant composition of the cavity solution may be attained at the highest temperature and especially above the natural deposit temperature. The prior art, on the contrary, has taught that solution mining best occur as near the deposit temperature as possible. It is therefore desired that a greater amount of potassium chloride be produced from a subterranean formation whereby the cavity solution attains the invariant composition at the highest temperature and even higher than the natural formation temperature so long as an appreciable amount of heat is not irretrievably lost into the formation. It is also desired that the solution be produced from the cavity at a rate allowable by average piping size, e.g., about 90 cubic meters per hour or greater.

SUMMARY OF THE INVENTION

It has been found that potassium chloride can be solution mined from a subterranean ore deposit containing potassium chloride and sodium chloride at a temperature higher than the natural deposit temperature, where the deposit ore has been rubblized into the cavity to effect a large contact surface area, where the invariant composition of the cavity solution is reached at the highest temperature and preferably greater than the natural deposit temperature, and where appreciable pumping rates are used, e.g., about 90 cubic meters per hour or higher. It has been found that so long as a large surface area is exposed, i.e., the deposit is rubblized, that the invariant composition may be reached at a temperature higher that the natural formation temperature. This is accomplished by (1) solution mining the ore rubble at the natural deposit temperature for a time sufficient to determine the mining rate at that temperature; (2) increasing the temperature of the cavity solution to a temperature determined to be near the highest temperature at which the invariant composition is achievable at the solvent dissolving rate; and (3) solution mining the ore at the higher temperature and withdrawing a solution near the invariant composition at the higher temperature.

It has been found that where a large amount of rubble has been created within a cavity, a heated solution does not lose very much heat to the surrounding deposit. It has also been found that by adjusting the temperature of the cavity solution to the highest temperature where the invariant composition is still achievable, there is the most efficacious and most times a substantial increase in the amount of potassium chloride mined. In most cases the amount of increase in the potassium chloride produced is great enough to account for the heat irretrievably lost lost to the formation. The withdrawn solution is at least 80 percent saturated with respect to potassium chloride, preferably 90 percent saturated with respect to potassium chloride, and even more preferably 95 percent saturated with respect to potassium chloride; and is at a temperature at least 5 degrees above the natural formation temperature and preferably at least 10 degrees above the natural formation temperature when the cavity is less than about 925 meters below the surface, and even more preferably at least 5 degrees above the natural formation temperature when the depth of the cavity is greater than about 925 meters below the surface.

BRIEF DESCRIPTION OF THE DRAWINGS

Further benefits and advantages of the instant invention will become apparent from the detailed description made with reference to the drawings, in which:

FIG. 1 is a graph which shows the solubility of a potassium chloride-sodium chloride-water system. Shown on the graph are a 50° C. and a 80° C. solubility isotherms for potassium chloride and sodium chloride dissolved in water;

FIG. 2 diagrammatically illustrates a subterranean cavity being solution mined where the cavity contains rubblized deposit ore.

DETAILED DESCRIPTION OF THE INVENTION

In accordance with the method of this invention potassium chloride is produced from a subterranean cavity in an ore deposit containing potassium chloride and sodium chloride and wherein the ore has been rubblized to affect a large contact surface area. This is done by maintaining the cavity solution at a temperature determined to be near the highest temperature at which the invariant composition is achievable at the solvent dissolving rate. Reference is now made to FIG. 2 which shows a cavity 10 in a KCl rich deposit 6, in which cavity rubble 5 has fallen from roof 9. The cavity 10 has a natural deposit temperature of 50° C. and is at a depth of about 1500 meters below the surface of the earth. Rubble 5 from the roof 9 of a cavity may fall inadvertantly or it may be induced by releasing the pressure within the cavity, thus removing the support that holds the roof and thereby causing the roof to collapse onto the floor of the cavity. In other methods of the art the roof is induced to collapse by drilling a well to just above the top of the roof and exerting hydraulic pressure which causes the roof to collapse to the floor of the cavity. In either event, enough rubble is made to create a large contact surface area. By a large contact surface area is meant an area on which there is at least about 0.0002 square meters of surface area of ore within the cavity per liter of solution in the cavity, where the rubble contains greater than about 24 percent by weight potassium chloride based on the total weight of potassium chloride and sodium chloride contained in the ore. This value is changed slightly by cavity shape, the amount of exposed potassium chloride and other influencing factors. Communicating with the cavity and the surface of the earth are two conduits 1 and 4. The wells are drilled and the conduits are installed by techniques well known in the art. The cavity may be created by solution mining or the cavity may be created by shaft and room and pillar type mining which has been converted to solution mining. A recognized method of establishing the cavity by solution mining methods is described in U.S. Pat. No. 3,278,234.

The cavity 10 is solution mined by introducing a solvent 3 into conduit 1 at a temperature of about 50° C. Reference is now made to FIG. 1 which shows that water used at this temperature as a solvent for dissolving an ore containing 30 percent potassium chloride on a basis of the total amount of potassium chloride and sodium chloride present in the ore, 119 grams of potassium chloride per liter of solution will be dissolved, if the salts were dissolved at their ratio of occurrence in the ore. But, since the cavity is rubblized, the solution will reach or approach its invariant composition of about 182 grams potassium chloride and about 225 grams sodium chloride per liter solution. The solution will usually be near or at 100 percent saturated with respect to sodium chloride. Depending upon the residence time of the solution in the cavity, the solution will attain more than 80 percent, often 90 percent and sometimes 95 percent saturation with respect to potassium chloride. As long as the solvent is injected an insulating fluid 11 can be placed at the roof of the cavity to insulate the cavity roof from the leaching action of the solvent.

The cavity is solution mined for a time sufficient to determine the mining rate, e.g., the time required for 20 percent volume displacement of the cavity. A cavity solution concentration profile is taken before and after the period for which the mining rate is to be calculated, so that the net increase of the inventory of potassium chloride in the cavity solution mined during that period as well as the amount withdrawn can be determined. This can be accomplished by using an apparatus similar to that which is taught in U.S. Pat. No. 3,600,039, whereby provision is made for insertion of a liner into a rubble pile by using a drill down liner. Once a drill has entered the pile a desired depth, means are provided for cutting the drill bit from the assembly. This special liner is inserted into the withdrawal well by this method and samples are taken from the bottom of the cavity and the bottom of the rubble pile, after which samples are taken from various elevations within the cavity by incrementally raising the liner. These samples are analyzed to determine the potassium chloride content. By doing this the amount of potassium chloride inventory within the entire cavity can be accurately estimated. Alternately, the solution concentration profile can be taken by a gamma logging tool on a wireline. The amount of potassium chloride mined by the solvent and withdrawn from the cavity during the period is also noted. The mining rate is calculated and expressed as the sum of the increase in cavity inventory plus the amount withdrawn from the cavity per unit time.

From this mining rate and the solvent dissolving rate it can be determined what surface area has been contacted by the solvent introduced into the cavity. This determination is made from the mining rate relation:

$MR = f(DR., A, T, \Delta C)$ where:
  $MR$ = mining rate (e.g., grams per unit time)
  $DR$ = dissolving rate (e.g., grams KCl per unit time per unit of exposed surface of KCL contacted)
  $A$ = surface area contacted
  $T$ = temperature
  $C$ = undersaturated driving force The dissolving rate can be determined from empirical data obtained by testing the dissolving rate of a mixture of potassium chloride and sodium chloride compressed in the form of pellets having a ratio of potassium chloride to sodium chloride equal to the average ratio occuring in the rubblized ore. This ratio is determined from core specimens of the deposit taken during the initial drilling. Further, the dissolving rate can be determined as a function of $\Delta C$ and as a function of temperature by varying the temperature of the solvent and plotting on a graph a relationship between the temperature, $\Delta C$ and the dissolving rate. From all this data the surface are contacted within the cavity is calculated from the MR relationship. Then again from the MR relationship and with the surface area known, the temperature at which the invariant composition is reached for that dissolving rate can be calculated. Hence, the highest temperature at which the invariant composition can be attained at the given dissolving rate can be calculated by trial and error. This temperature will be the higher temperature at which further solution mining is conducted.

Reference is again made to FIG. 1. It can be seen that if the cavity solution is allowed to reach the invariant composition at the natural cavity temperature (50° C.), the solution would contain 182 grams potassium chloride per liter of solution. However, if, for example, the invariant composition can be reached at 80° C. for the ore dissolving rate, 234 grams potassium chloride per liter of solution can be mined. Hence, the rubblized cavity after being heated from 50° C. to 80° C. can be mined at an additional rate of 52 grams potassium chloride per liter of solution. This is in contrast to a rate of 119 or 122 grams potassium chloride per liter of solution when potassium chloride is mined at 50° C. and 80° C. respectively at the ratio potassium chloride occurs within the deposit.

The cavity solution is then heated until it reaches the higher temperature. This can be accomplished by injecting into the cavity a solvent at a temperature higher than the temperature to which the cavity is to be heated. The cavity can be heated quickly by introducing steam or a very hot solvent into the cavity or may be done slowly by introducing a solvent which is only slightly hotter than the temperature of the cavity solution. The method by which this would be done is ascertainable by those who are skilled within the art of subterranean heat and fluid transport phenomena.

The cavity can be mined at the higher temperature so long as the invariant composition of the cavity solution is reached at the elevated temperature. When the concentration of the solution within the cavity begins to decrease, it may be desirable to cause further rubblizing of the roof of the cavity to affect a larger surface area contact with the solvent solution. This may be done by the various methods known in the art such as those which are mentioned above. Then the procedure of the invention may be repeated. Accordingly, the cavity would be mined at a given temperature, (at this point it may be a temperature higher than the natural temperature) to determine the mining rate at that temperature. A cavity concentration profile is again taken of the solution within the cavity before and after a period of time by analyzing the solution at various levels within the cavity by incrementally raising the withdrawal point within the cavity (or concentration profile is determined by other methods) until the concentration of the cavity solution can be determined for several levels within the cavity as described above. The mining rate for that period is calculated. Then a new temperature is determined by the method described above wherein the highest temperature at which the cavity solution can reach the invariant composition is determined. Then the cavity is begun to be mined at this new temperature and is continued to be mined so long as the cavity solution reaches or approaches the invariant composition.

In some cases after further rubblizing ore in the cavity, relatively lean ore may predominate. In this instance, the adjustment of the temperature of the cavity solution to the highest temperature at which the invariant composition is reached may be a lower temperature than the previous mining temperature, sometimes lower than the natural deposit temperature and sometimes higher than the natural deposit temperature. An adjustment of the cavity solution temperature may also be made to account for a reduced mining rate owing to depletion of the ore or owing to other reasons.

Benefits of the present invention may be realized even if the highest temperature at which the invariant composition can be reached is not attained. Temperatures between the natural formation temperature and the highest temperature of the invariant composition at the mining rate may also be used. In cases where the heat loss from the cavity is great, it may be preferred that lower temperatures than the optimum temperature be used. Thus, it becomes a matter of economics. When the amount of heat loss exceeds the benefit of the increase in potassium chloride produced, then the temperature of the cavity should be reduced. On the other hand, when the heat loss from the cavity is low relative to the amount of increase in potassium chloride produced, then the highest temperature at which the invariant composition of the cavity solution can be reached should be used. Hence, there may also be cases where the invariant composition of the solution within the cavity need not be reached. Where heat loss from the cavity is relatively low then the optimum temperature may be used when the cavity solution attains only 80 percent saturation with respect to potassium chloride, preferably when it attains 90 percent saturation with respect to potassium chloride, and even more preferably when it attains 95 percent saturation with respect to potassium chloride. Accordingly, under favorable conditions, the temperature to which the cavity is heated may be within 15° C. of the optimum temperature, preferably within 10° C. of the optimum temperature, and even more preferably within 5° C. of the optimum temperature.

If after mining for some time and further rubblizing of the roof of the cavity is not possible and the concentration of the solution within the cavity begins to decrease, it may be desirable to lower the cavity solution temperature to a temperature at which the invariant composition of the solution may be reached, sometimes as low as the natural deposit temperature or lower.

It should be readily apparent to those skilled in the art that other salts having characteristics as potassium chloride and sodium chloride can be solution mined in accordance with the present invention so long as the salts can be formed into a solution having an invariant composition which is affected by temperature.

Although the present invention has been described with reference to specific details of certain embodiments thereof, it is not intended that such details should be regarded as limitations upon the scope of the inventions, except and so forth as they are included in the accompanying claims.

What is claimed is:

1. A method of solution mining potassium chloride from a cavity in a subterranean ore deposit containing potassium chloride and sodium chloride, in which cavity ore has been rubblized to effect a large contact surface area, comprising:
   A. solution mining the ore rubble at a first temperature for a time sufficient to determine the mining rate for that temperature;
   B. adjusting the temperature of the cavity solution to a temperature determined to be near the highest temperature, based on the surface area calculated from the mining rate at the first temperature, at which the invariant composition is achievable at the solvent dissolving rate at the adjusted temperature;
   C. solution mining the ore near the adjusted temperature; and
   D. withdrawing solution near the invariant composition of the adjusted temperature.

2. A method of solution mining potassium chloride from a subterranean ore deposit containing potassium chloride and sodium chloride comprising:
   A. creating a cavity within the ore deposit;
   B. causing a rubble of the ore to fall into the cavity;
   C. solution mining the ore rubble at a first temperature for a time sufficient to determine the mining rate at that temperature;
   D. adjusting the temperature of the cavity solution to a temperature determined to be near the highest temperature, based on the surface area calculated from the mining rate at the first temperature, at which the invariant composition is achievable at the solvent dissolving rate at the adjusted temperature;
   E. solution mining the ore rubble near the higher temperature; and
   F. withdrawing a solution from the cavity near its invariant composition at that temperature.

3. The method of claim 2, wherein the cavity solution is increased to within 15° C. of the highest temperature at which the invariant composition is achievable at the solvent dissolving rate.

4. The method of claim 2, wherein the cavity solution is increased to within 10° C. of the highest temperature at which the invariant composition is achievable at the solvent dissolving rate.

5. The method of claim 2, wherein the cavity solution is increased to within 5° C. of the highest temperature at which the invariant composition is achievable at the solvent dissolving rate.

6. The method of claim 2, wherein the invariant composition of the withdrawn solution is near 100 percent saturated with respect to sodium chloride and at least 80 percent saturated with respect to potassium chloride.

7. The method of claim 2, wherein the invariant composition of the withdrawn solution is near 100 percent saturated with respect to sodium chloride and at least 90 percent saturated with respect to potassium chloride.

8. The method of claim 2, wherein the invariant composition of the withdrawn solution is near 100 percent saturated with respect to sodium chloride and at least 95 percent saturated with respect to potassium chloride.

9. The method of claim 2, which further comprises:
   A. analyzing the cavity solution concentration profile to determine the mining rate at the higher temperature; and
   B. adjusting the temperature of the cavity solution to near the highest temperature, based on the surface area calculated from the mining rate at the first temperature, at which the invariant composition is achievable at the solvent dissolving rate at the adjusted temperature.

10. The method of claim 2, which further comprises:
   A. causing further rubble of the deposit ore to fall into the cavity;
   B. solution mining the ore rubble at a second temperature for a time sufficient to determine the mining rate at the second temperature;
   C. adjusting the temperature of the cavity solution to near the highest temperature, based on the surface area calculated from the mining rate at the second temperature, at which the invariant composition is achievable at the solvent dissolving rate at the adjusted temperature;
   D. solution mining the ore at near the adjusted temperature; and
   E. withdrawing solution from the cavity near the invariant composition for the cavity solution adjusted temperature.

11. The method of claim 2, wherein the adjusted temperature is more than 5° C. above the natural deposit temperature.

12. The method of claim 2, wherein the adjusted temperature is more than 10° C. above the natural deposit temperature.

13. The method of claim 1 or 2, wherein the first temperature is a natural deposit temperature.

14. The method of claim 1 or 2, wherein the cavity is solution mined at the first temperature for a time sufficient for 20 percent volume displacement.

15. The method of claim 1 or 2, wherein the temperature is adjusted by introducing steam into the cavity.

16. The method of claim 1 or 2, wherein the cavity is solution mined at a rate of about 90 cubic meters per hour or higher.

17. The method of claim 11 or 12, wherein the depth of the cavity is greater than 925 meters.

* * * * *